G. H. DAVIS.
BALE OR PACKAGE REMOVING MECHANISM.
APPLICATION FILED MAR. 13, 1915.
1,149,250.
Patented Aug. 10, 1915.
3 SHEETS—SHEET 1.
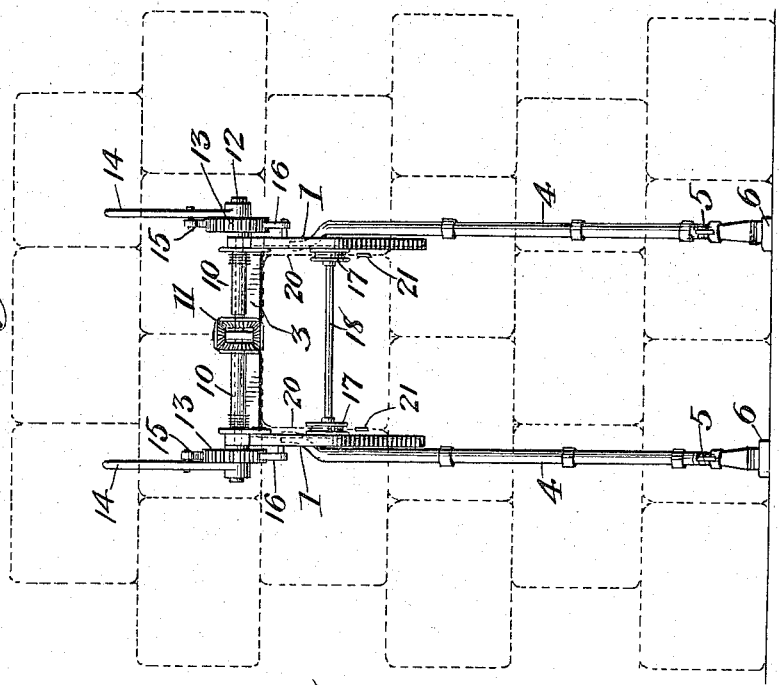
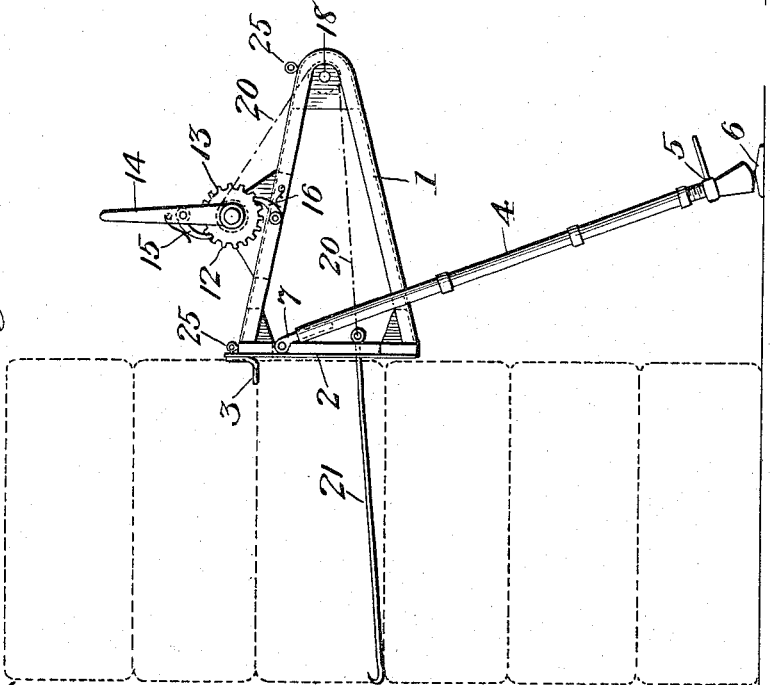

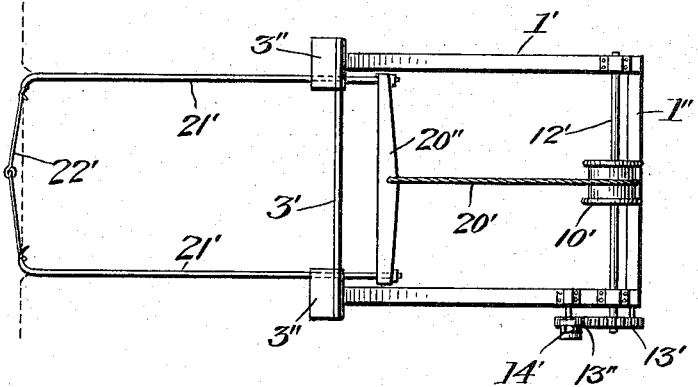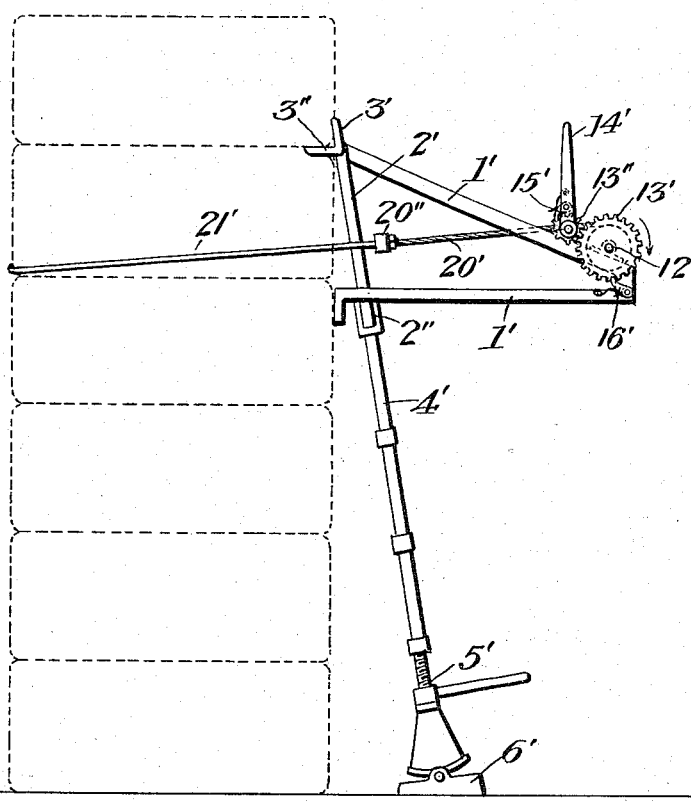

G. H. DAVIS.
BALE OR PACKAGE REMOVING MECHANISM.
APPLICATION FILED MAR. 13, 1915.
1,149,250.
Patented Aug. 10, 1915.
3 SHEETS—SHEET 3.
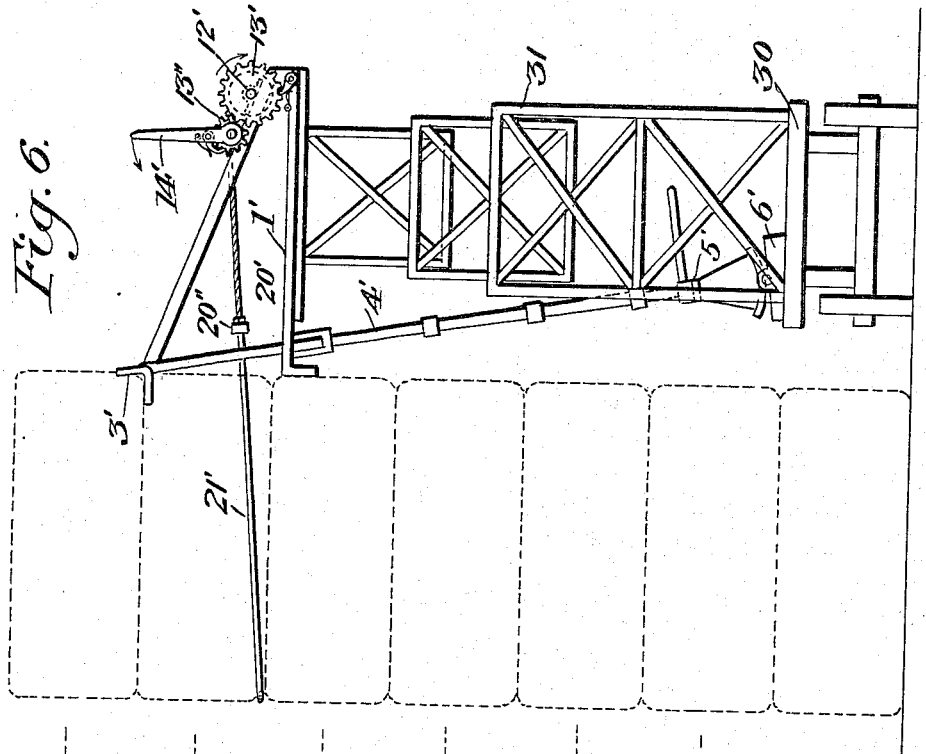
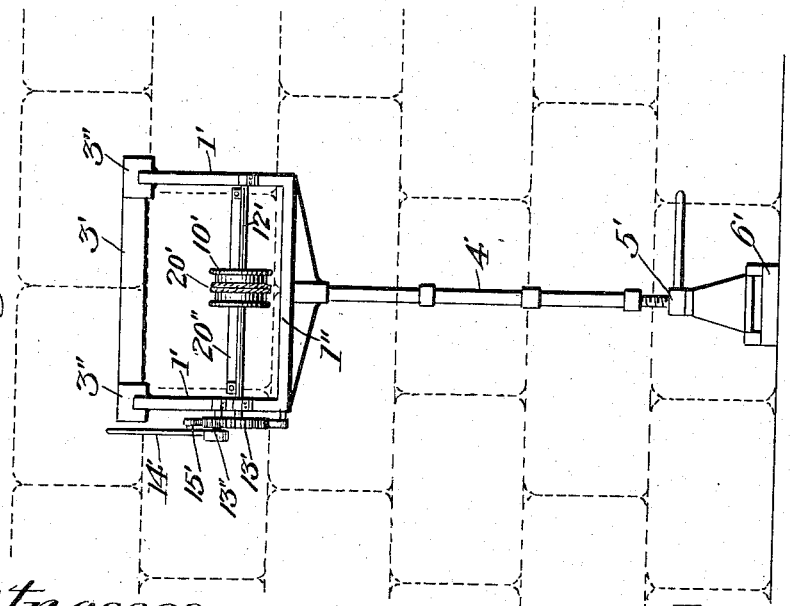

UNITED STATES PATENT OFFICE.

GEORGE H. DAVIS, OF NEW ORLEANS, LOUISIANA, ASSIGNOR TO FORD, BACON & DAVIS, OF NEW YORK, N. Y., A FIRM.

BALE OR PACKAGE REMOVING MECHANISM.

1,149,250.  Specification of Letters Patent.  Patented Aug. 10, 1915.

Application filed March 13, 1915.  Serial No. 14,128.

*To all whom it may concern:*

Be it known that I, GEORGE H. DAVIS, a citizen of the United States, and resident of New Orleans, parish of Orleans, State of Louisiana, have invented certain new and useful Improvements in Bale or Package Removing Mechanism; and I do hereby declare the following to be a full, clear, and exact description of the invention, such as will enable others skilled in the art to which it appertains to make and use the same.

The invention relates to mechanism for extracting, withdrawing or removing individual elements, such as bales, packages or other containers of goods in bulk, or separate articles, which it is customary to assemble and store in rows and tiers, and to this end, comprises a frame adapted to be brought into proximity with the face of the pile of bales or the like, associated with lifting jack mechanism adapted to engage and lift the bales superposed on the bale to be extracted, together with means which may conveniently take the form of long hooks or rods adapted to be passed between the bale to be extracted and the adjacent bales, and to engage the rear of the desired bale, and suitable means, preferably a winding drum and cable connected with the hooks or other bale-engaging element to exercise a longitudinal pull on the hooks and thereby withdraw the desired bale, after the latter has been relieved of the weight of the superposed bales by the lifting jack mechanism to an extent sufficient to permit such withdrawal.

The invention is illustrated in the accompanying drawing, in which,

Figure 1 is a side elevation of a simple form of the mechanism adjusted to position to effect the removal of one of the bales from a pile or stack. Fig. 2 is a front elevation of the same. Fig. 3 is a side elevation of a modified form of apparatus. Fig. 4 is a plan view thereof. Fig. 5 is a front elevation thereof. Fig. 6 illustrates the apparatus shown in Figs. 3, 4 and 5 mounted upon a vertically adjustable tower wagon by means of which the apparatus may be readily transported from place to place.

Referring to Figs. 1 and 2 of the drawings, the main frame of the apparatus comprises two V-shaped side members connected at their divergent ends by cross braces 2 and suitably strengthened at the various angles and corners by gusset plates. Connecting the upper rear portions of the side frames 1 is an angle bar 3, the horizontal flange of which is adapted to be forced between the bales of superposed rows, as indicated in Fig. 1, when the frame is brought into abutting relation with the face of the pile or stack of bales.

In order to support the frame in proper relation in front of the stack of bales, there is provided a longitudinally adjustable extensible lifting jack mechanism on each side of the frame, as shown in Fig. 2. Each of said lifting jack mechanisms comprises a strut member 4, preferably made up of readily removable pipe or rod sections, connected to each of the cross braces 2 of the frame by means of a pivoted lug 7 adapted to be inserted in the end of the upper tubular section of the strut 4, and a jack 5 connected with the lower end of the strut resting upon a base plate 6. The said jack 5 may be of any desired or convenient type and is illustrated as a simple form of screw jack. As illustrated in Fig. 1, the extensible struts of the lifting jack mechanism are placed at an inclination so as to afford a firm support for the mechanism and admit of the jacks being operated to lift the bales superposed on the bale to be extracted to relieve the latter of the weight of the upper bales. The length of the struts 4 may be regulated by inserting or removing the intermediate sections so as to properly support the frame immediately in front of the bale to be removed, as will be readily understood from the illustration.

Journaled in suitable bearings on the upper member of each of the side frames 1 is a shaft 12 which carries two winding drum sections 10, which are connected together by a differential gearing 11, as illustrated in Fig. 2. Mounted on the outer end of the drum sections 10 are ratchet wheels 13, adapted to be operated by pivoted levers 14 journaled on the ends of the shaft 12 and carrying actuating pawls 15 engaging the teeth of the wheels 13, and locking pawls 16 are pivoted on the side members 1 of the frame and serve to hold the drums 10, 10 in the usual manner. Each of said drum sections is provided with a section of hauling cable 20, and the cable sections pass over guide pulleys 17, 17 mounted upon a transverse shaft 18 journaled in the forward ends of the frame members 1. The end of each of the cables 20 is connected with a hook 21. The said hooks 21 are adapted to be passed along each side of the bale to be extracted between the same and the adjacent bales, until the rear ends thereof project beyond the rear face of the stack of bales, after which the hooks are turned so as to cause the hooked ends thereof to engage the rear face of the bale to be extracted, as illustrated in Fig. 1.

If desired, the frame and appurtenant mechanism may be supported by means of cables or the like from an overhead crane or traveling trolley, the cables being connected to the frame by means of eye bolts 25, 25, as indicated in Fig. 1.

In operating the apparatus to extract or withdraw a bale from a pile, the frame is moved to a position immediately in front of the desired bale and until the rear face of the frame abuts the face of the pile, with the transverse member 3 of the frame underlying the forward edges of the bales immediately above the bale to be extracted. The strut members 4 of the lifting jack mechanism are then adjusted as to length to support the frame from the floor or other foundation, and the lifting jacks 5 are operated to elevate the struts 4 and thereby lift the superposed bales. The cable sections 20 having been drawn off the drums to a sufficient extent to permit the long hooks 21 being passed along each side of the desired bale until the hook ends thereof engage the rear face of the desired bale, the drums 10 are then operated by means of the hand levers 14 to wind up the cable sections. By reason of the differential gearing interposed between the drum sections, equal and uniform pulling strains are imposed upon the two cable sections 20. As the cable sections are wound upon the corresponding drums, the hooks and the bale engaged thereby are moved transversely of the pile, until the desired bale either drops out or may be quickly forced out of engagement with the other bales. After the bale has been removed, the jacks 5 are reversed to permit the superposed bales to settle down into their normal position, after which the mechanism can be removed and transported to a position to extract another bale.

It will be particularly noted that the machine is simple, compact and relatively light and may be readily moved from place to place and operated with a minimum amount of labor to withdraw any desired bale from a pile or stack, without disturbing the relation of the other bales and without injuring any of the bales.

The modification of the apparatus illustrated in Figs. 3, 4 and 5 operates upon the same principle, but is somewhat simpler in construction. The said modification involves a frame consisting of the side members 1', 1', front cross brace 1'', a rear cross brace 3' terminating in two horizontal bale-engaging flange members 3'', which correspond with the bale lifting element 3 of the modification shown in Figs. 1 and 2. The rear portion of the frame also includes inclined brace members 2', and a horizontal cross connection 2'' which is provided with a central socket to receive the end of the adjustable and extensible strut 4', which, together with the lifting jack 5' constitutes the means for raising the bales superposed on the one to be extracted, as hereinbefore described. Journaled in the forward part of the frame side members 1' is a shaft 12' carrying a winding drum 10' upon which operates hauling cable 20' attached to a cross yoke 20'', to the outer ends of which are secured rods or hooks 21' which are adapted to be passed through the stack of bales along each side of the bale to be removed and to engage the rear face of said bale by means of the hooks on the ends thereof, or, if desired, a sling-like connection 22', as illustrated in Fig. 4. The drum 10 is operated by means of a pinion 13' on one end of the shaft thereof, which meshes with a ratchet gear 13'' journaled on the end of a stub shaft secured to the side frame 1', which ratchet gear is operated by a pawl 15' carried by a hand lever 14' loosely mounted on the stub shaft. A locking pawl 16' mounted on the side frame 1' preferably engages the pinion 13', as shown in Fig. 3. The operation of this particular form of the apparatus is similar to that hereinbefore described. The frame is moved adjacent the face of the stack of bales immediately in front of the bale to be extracted so that the flange members 3'' are slipped beneath the bales lying immediately above the desired bale. The strut member 4' is then assembled to support the frame, after which the jack 5 is operated to lift the superposed bales, and after the downward pressure of the latter has been sufficiently relieved, the drum 10' is rotated by means of the hand lever 14' to wind up the cable 20', which moves the yoke 20'' outward and withdraws the hooks or rods 21' and the bale to which the latter are secured.

It may be found convenient and desirable to mount the apparatus as hereinbefore described on a wagon or truck to facilitate the transportation and adjustment of the apparatus, and such an arrangement is illustrated in Fig. 6, in which the particular form of bale pulling mechanism shown in Figs. 3, 4 and 5 is mounted upon a truck or wagon 30, the lifting jack mechanism being preferably supported from the wagon bed and the frame of the pulling apparatus being supported by means of an adjustable or extensible platform or tower 31 carried by the wagon. The tower may be adjusted to any desired height by any appropriate means commonly employed in such structures, and incidentally serves as a support for the bale after the same has been withdrawn from the pile.

What I claim is:—

1. A machine for removing bales and packages from piles of the same, comprising a frame adapted to abut the face of the pile, lifting jack mechanism associated with said frame to engage and lift bales superposed on the bale to be removed, means for engaging the desired bale, and means carried by the frame to move the bale engaging means and the bale outward from the pile.

2. A machine for removing bales and packages from piles of the same, comprising a frame adapted to abut the face of the pile, lifting jack mechanism associated with said frame to engage and lift bales superposed on the bale to be removed, hooks engaging the desired bale, and mechanism on said frame connected with said hooks to move the hooks and attached bale outwardly of the pile.

3. A machine for removing bales and packages from piles of the same, comprising a frame adapted to abut the face of the pile, lifting jack mechanism associated with said frame to engage and lift bales superposed on the bale to be removed, hooks engaging the desired bale, and winch mechanism on said frame connected with said hooks to move the hooks and attached bale outwardly of the pile.

4. A machine for removing bales and packages from piles of the same, comprising a frame adapted to abut the face of the pile, longitudinally extensible lifting jack mechanism associated with said frame to engage and lift bales superposed on the bale to be removed, means for engaging the desired bale, and means carried by the frame to move the bale engaging means and bale outward from the pile.

5. A machine for removing bales and packages from piles of the same, comprising a frame adapted to abut the face of the pile, longitudinally extensible lifting jack mechanism connected to and supporting said frame in operative position to engage and lift bales superposed on the bale to be removed, means for engaging the desired bale, and means carried by the frame to move the bale engaging means and bale outward from the pile.

In testimony whereof I affix my signature, in presence of two witnesses.

GEORGE H. DAVIS.

Witnesses:
A. FISCHER,
JOE WEHMAN.

Copies of this patent may be obtained for five cents each, by addressing the "Commissioner of Patents, Washington, D. C."